(12) United States Patent
Craven

(10) Patent No.: US 6,666,638 B2
(45) Date of Patent: Dec. 23, 2003

(54) DECK SCREW HAVING MULTIPLE THREADED SECTIONS

(75) Inventor: Arnold Craven, Holyoke, MA (US)

(73) Assignee: Phillips Screw Company, Wakefield, MA (US)

( * ) Notice: Subject to any disclaimer, the term of this patent is extended or adjusted under 35 U.S.C. 154(b) by 192 days.

(21) Appl. No.: 09/783,124

(22) Filed: Feb. 15, 2001

(65) Prior Publication Data

US 2002/0110439 A1 Aug. 15, 2002

(51) Int. Cl.$^7$ ................................................ F16B 25/10
(52) U.S. Cl. ..................................... 411/413; 411/387.2
(58) Field of Search .............. 411/411–413, 386–387.8, 411/399

(56) References Cited

U.S. PATENT DOCUMENTS

| | | | |
|---|---|---|---|
| 440,334 A | | 11/1890 | Rogers |
| 1,175,665 A | | 3/1916 | Sweet |
| 1,980,093 A | * | 11/1934 | Rosenberg |
| 2,292,557 A | * | 8/1942 | Wilson |
| 2,419,555 A | | 4/1947 | Fator |
| 3,093,025 A | | 6/1963 | Wasserman |
| 3,124,408 A | | 3/1964 | Oestereicher |
| 3,177,755 A | | 4/1965 | Kahn |
| 3,478,639 A | | 11/1969 | Gruca |
| 3,524,378 A | * | 8/1970 | Wieber |
| 3,682,507 A | * | 8/1972 | Waud |
| 4,096,901 A | * | 6/1978 | Reichenbach |
| 4,194,430 A | | 3/1980 | Muenchinger |
| 4,621,963 A | * | 11/1986 | Reinwall |
| 4,653,244 A | | 3/1987 | Farrell |
| 4,808,051 A | | 2/1989 | Gietl |
| 4,844,676 A | | 7/1989 | Adamek |
| 4,854,311 A | | 8/1989 | Steffee |
| 4,959,938 A | | 10/1990 | DeCaro |
| 5,531,553 A | | 7/1996 | Bickford |
| 5,536,127 A | | 7/1996 | Pennig |
| 5,735,653 A | | 4/1998 | Schiefer et al. |
| 5,863,167 A | | 1/1999 | Kaneko |
| 6,000,892 A | | 12/1999 | Takasaki |
| 6,030,162 A | | 2/2000 | Huebner |
| 6,050,765 A | * | 4/2000 | McGovern |
| 6,074,149 A | | 6/2000 | Habermehl et al. |
| 6,086,303 A | | 7/2000 | Fluckiger |
| 6,325,583 B1 | * | 12/2001 | Mattle ........................ 411/413 |

FOREIGN PATENT DOCUMENTS

IT         598490    * 10/1959

* cited by examiner

*Primary Examiner*—Flemming Saether
(74) *Attorney, Agent, or Firm*—Dickstein Shapiro Morin & Oshinsky LLP (57) ABSTRACT

A fastener for securing remnant-producing materials, a method of manufacturing the fastener, and a method of using the fastener are provided. The fastener is configured such that in use any remnants or slivers produced by rotation of the fastener are forcibly driven into the surface of the material. In one aspect, the fastener has two separate threaded portions, a first or lower threaded portion and a second or upper threaded portion. The threads on the lower threaded portion have a pitch that is different from the threads on the upper threaded portion. In one embodiment, the lower threaded portion threads have a larger pitch than the threads on the upper threaded portion. In use, after the lower threaded portion is completely inserted into the material, the upper threaded portion of the fastener enters the material. Because the upper threaded portion has threads that have a pitch that is different from the threads on the lower threaded portion, the threads on the upper threaded portion capture the remnants that have been extruded within or onto the surface of the material. As the fastener is completely inserted into the material, the remnants that have been extruded by the lower threaded portion of the fastener are substantially retained in the bore by the upper threaded portion of the fastener.

13 Claims, 9 Drawing Sheets

DECK SCREW HAVING MULTIPLE THREADED SECTIONS

BACKGROUND

The present invention relates generally to fastening systems. In particular, the present invention relates to a screw for penetrating and securing a workpiece.

In construction and furniture building involving wood products, the use of alternative materials is becoming more common. Some alternative materials are made entirely from post-consumer polyethylene waste such as bottles and other recycled plastics. Other alternative materials are manufactured by mixing wood and other materials such as glass, steel, and carbon fibers with a suitable binder to vary the characteristics of the final material. Materials alternative to wood are used to construct everything from cabinets to decks. Such alternative materials are made by various processes. For example, alternative material lumber may be made by blending recycled plastic resins with sawdust and extruding the blended mixture into standard lumber sections.

Such alternative materials have many advantages over wood. The alternative materials are often stronger and more durable then even pressure treated lumber. Many materials also offer better resistance to moisture, corrosive substances, termites and other insects, and other environmental strains that often prove to be detrimental to wood.

The use of standard fasteners with these alternative materials, however, may produce unwanted results. Screws are commonly used to affix one workpiece to another. However, some of the above mentioned alternative materials may not compress as readily as wood to accommodate the added volume of the inserted screw. With respect to some of the above-mentioned alternative materials, insertion of the screw, particularly if there is no pre-drilled hole to accommodate the screw, can cause remnants or shavings to be cut, extruded, or otherwise removed from the hole made by the screw. Such alternative materials may be referred to as "remnant-producing" materials, and may include materials in addition to the alternative materials mentioned above. Some of the remnants may remain attached to the material or held to the material by the screw, and extend above the material surface. These remnants then have to be removed by sanding or other methods. A common way to reduce this problem is to pre drill holes in the locations where a screw-type fastener must be inserted. This technique is laborious and time consuming. What is needed is a fastener adapted for use with a remnant-producing material where insertion of the fastener, particularly without pre-drilling holes, leaves a smoother surface on the remnant-producing material, reducing or eliminating remnants.

SUMMARY

The present inventions provide a fastener for securing remnant-producing materials, a method of manufacturing the fastener, and a method of using the fastener so that remnants or slivers produced by rotation of the fastener are substantially embedded within the remnant-producing material.

A fastener is provided having two separate threaded portions, a first or lower threaded portion having a first thread pitch and a second or upper threaded portion having a second thread pitch. The leading lower thread portion is designed to engage the work piece more firmly than the following upper thread portion. Thus, upon insertion of the screw, as both threaded portions engage the work piece, the first section substantially maintains its position or insertion rate with respect to the work piece defined by the pitch of the lower threads. The second threaded portion having a different thread pitch engages the work piece less firmly and thus is pulled through the work piece by the first set of threads substantially at the rate defined by the angle of the first set of threads. If the respective upper and lower thread pitches were equal, the upper threads would merely follow in the tracks or parallel to the tracks of the first leading threads. By making the thread pitches different, the second threaded portion engages and pulls with it remnants and/or wall material, retaining or pulling it into the bore.

In one aspect of the present inventions, the pitch of the second portion threads is less than the pitch of the threads of the first portion. The second threaded portion pitch in such an embodiment may spiral in the same direction as the first thread portion, may be of zero pitch, i.e., one or more rings around the screw shank, or may be of negative pitch, i.e., spiral in a direction that is opposite of the threads on the first or lower threaded portion.

In another aspect of the present inventions, the threads on the second or upper threaded portion have a larger diameter than the threads on the first or lower threaded portion.

In use, the first or lower threaded portion of the fastener is engaged with the remnant-producing material and rotated in the direction of the threads to insert the fastener into the material. This rotation may produce remnants or slivers by extruding, cutting, or some other mechanism. These remnants may extend from the hole in the material or workpiece surface made by the screw.

After the lower threaded portion is completely inserted into the material, the upper threaded portion of the fastener enters the material. Because the upper threaded portion has threads that have a different thread pitch relative to the threads on the lower threaded portion, the threads on the upper threaded portion capture the remnants that have been extruded within and/or onto the surface of the workpiece. As the fastener is completely inserted into the material, the remnants that have been extruded by the lower threaded portion of the fastener are substantially retained in the bore by the upper threaded portion of the fastener.

Therefore, a fastener and a method for inserting the fastener are provided to answer a need that currently exists in the construction industry.

These and other features and advantages of the invention will be more clearly understood from the following detailed description and drawings of preferred embodiments of the present invention.

DETAILED DESCRIPTION OF PREFERRED EMBODIMENTS

Figure 1:
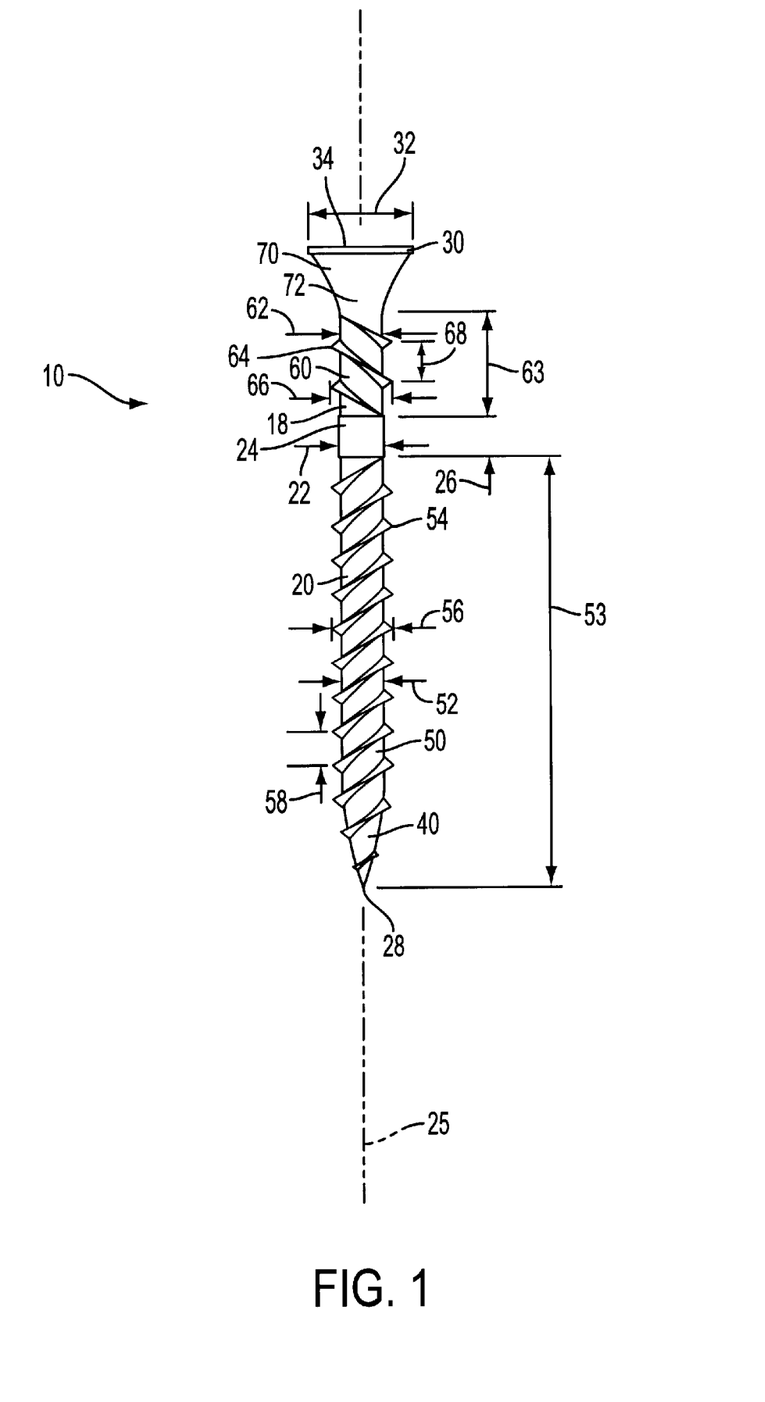
FIG. 1 is a side view of a screw according to a preferred embodiment of the present invention.

Refer now to FIG. 1 there being shown a fastener or screw, generally designated by reference numeral 10, according to a preferred embodiment of the present invention. The fastener 10 includes a shank 20 extending between a head 30 and a tapered tip 40. The head 30 has a diameter 32, and also includes a recess 34 (not shown) configured (e.g., slotted or cruciform shaped) to accommodate a driver for rotating the fastener 10. The screw 10 has an axis 25.

In the illustrated embodiment, the shank 20 of the fastener 10 has two threaded portions: a first or lower threaded portion 50 and a second or upper threaded portion 60. In a preferred embodiment, the lower threaded portion 50 has right-hand threads 54. The upper threaded portion 60 has left-hand threads 64. The lower threaded portion 50 has a length 53, a lower thread diameter 56, and a lower shank diameter 52. The upper threaded portion 60 has a length 63, an upper thread diameter 66, and an upper shank diameter 62.

The threads on the first or lower threaded portion 50 have a pitch 58 that is defined by the axial distance from a point (usually the crest) on a thread to a corresponding point on an adjacent thread. The threads on the second or upper threaded portion 60 have a pitch 68 that is similarly defined. In the illustrated embodiment, the thread pitch 68 of the upper threaded portion 60 is negative and thus is less than the thread pitch 58 of the lower threaded portion 50.

The head diameter 32 is greater than the shank diameters 52 and 62. As illustrated in FIG. 1, a neck 70 extends between the upper threaded portion 60 and the head 30. The neck 70 has an outer surface 72. In the illustrated embodiment, the neck 70 is manufactured to have a diameter enlarging in a tapered fashion to transition from the upper threaded portion shank diameter 62 to the head diameter 32. In the illustrated embodiment, the lower part of the neck 70 has the same diameter as the shank diameter 62, and the upper part of the neck 70 is the same in diameter as the head diameter 32. In this embodiment, the neck 70 is manufactured to be of increasing diameter from the lower portion to the upper portion of the neck 70. The neck surface 72 is tapered from the shank diameter 62 to the head diameter 32. Alternatively, a portion or portions of the neck could be straight or not tapered. The neck is tapered so that in use, as the leading surface, i.e., the neck surface 72 of the illustrated embodiment, enters a work piece, the work piece will gradually compress to accommodate the screw 10 as it is inserted, preferably without the need to pre-drill holes in the work piece. The desirable angle or degree of taper may depend upon the compressibility or the characteristic of the work piece. Any abrupt flange, protrusion, ridge or other surface in the leading neck surface 72 could engage the work piece and inhibit the screw's insertion into the work piece, particularly if the abrupt surface has to travel a substantial distance into the material.

The upper threaded portion 60 and the lower threaded portion 50 are separated by a transition section 24 that has a length 26. The transition section 24 is manufactured to contain no threads. In the illustrated embodiment, the transition section 24 has a diameter 22 that is slightly greater than the shank diameters 52 and 62, but smaller than the upper and lower thread diameters 66 and 56. Alternatively, the transition section diameter 22 can be equal to or smaller than the shank diameters 52 or 62, but should not be so large as to substantially inhibit insertion of the screw into the work piece. For example, powdery material, such as drywall, easily breaks or compresses, and could accommodate abrupt changes or flanges, whether or not the material produces remnants from any paper or other coverings. However, other materials are more resistant to compression and tapered neck screw heads are more readily insertable into such materials.

The lower threaded portion 50 extends to the tapered tip 40 and a point 28, similar to a conventional wood screw. The point 28 is essentially a sharp end to the shank 20. As illustrated in FIG. 1, the tapered tip 40 is manufactured to be decreasing in diameter from the shank diameter 52 to the point 28. The threads 54 of the lower threaded portion 50 are conventionally manufactured to continue onto the tapered tip 40 and to end at the point 28. The lower threaded portion thread diameter 56 decreases at the tapered tip 40 and comes to an essentially sharp end on point 28. The lower threaded portion threads 54 on the tapered tip 40 and point 28 may be manufactured to be self-tapping threads. Self-tapping threads reduce the need to pre-drill holes in a workpiece.

The fastener 10 is manufactured from a blank that may initially be uniform in diameter. The blank, which may be made form steel, aluminum, or other material, is deformed by a thread rolling machine to achieve the form illustrated in FIG. 1. The blank may be rolled in a first direction to form the first or lower threaded portion 50. The blank may be rolled in a second direction to form the second or upper threaded portion 60. The head 30, the neck 70, and the tapered section 22 may be formed during the above mentioned rolling steps, or during separate rolling steps. Alternatively, the rolling machine may have appropriate dies so that the fastener 10 can be manufactured in one rolling step. During the rolling process, threads may receive forging properties that help increase the fastener's fatigue strength and loading strength.

Figure 2:
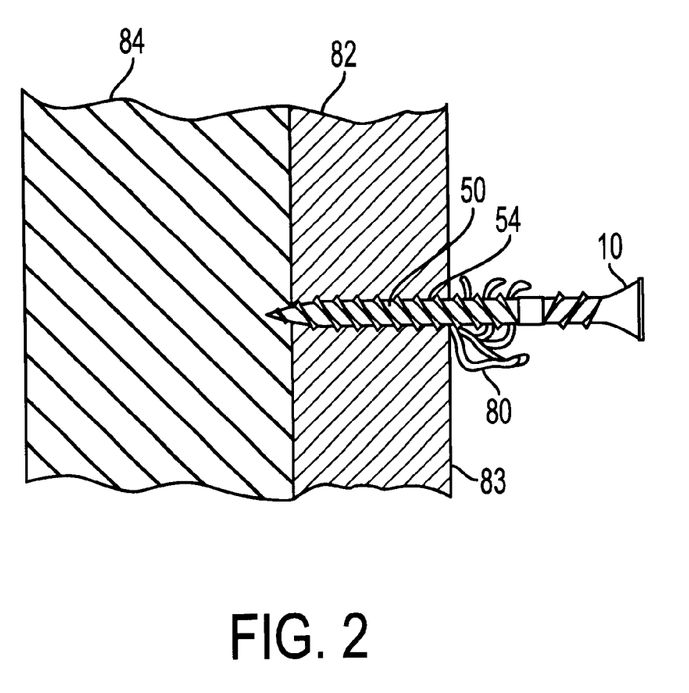
FIG. 2 is a cross-sectional view showing the screw of FIG. 1 engaged in a remnant-producing material.

Refer now to FIG. 2 that illustrates the fastener 10, a remnant-producing material 82, a base material 84, and remnants 80. In use, as the fastener 10 is rotated into the remnant-producing material 82, remnants are cut, extruded, or otherwise removed to the surface 83 of the remnant-producing material 82. The remnants 80 are forced out of the remnant-producing material 82 by the rotation of the threads 54 on the lower threaded portion 50 of the fastener 10.

Figure 3:
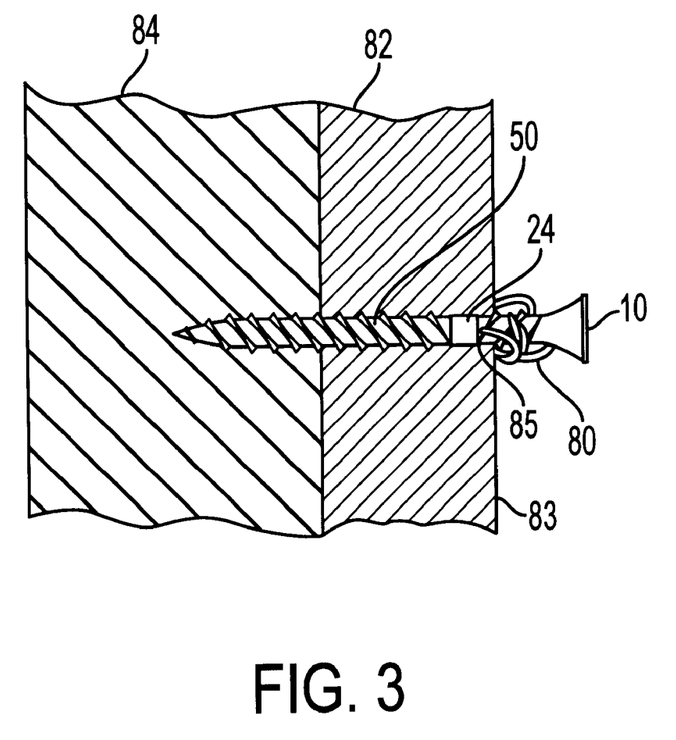
FIG. 3 is a view similar to FIG. 2.

Refer now to FIG. 3 that illustrates the fastener 10, the remnant-producing material 82, the base material 84, and remnants 80. In use, at this stage of the method of the present invention the lower threaded portion 50 and the transition section 24 are completely inserted into the remnant-producing material 82. The lower threaded portion 50 may also at this stage become engaged with the base material 84. The upper threaded portion 60 is at this stage at least partially inserted into the remnant-producing material 82. The upper threaded portion 60, by virtue of having threads 64 with a different pitch from the lower portion 50, captures the remnants 80 onto the upper threaded portion 60. The remnants 80 are captured by the threads 64 of the upper threaded portion 60 and may also be captured by the neck 70. As the fastener 10 is further inserted into the remnant-producing material 82, the remnants 80 are forcibly driven from the surface 83 of the remnant-producing material 82 and from the upper threaded portion 60 into the hole or bore 87 of the remnant-producing material 82 along with the fastener 10.

Figure 4:
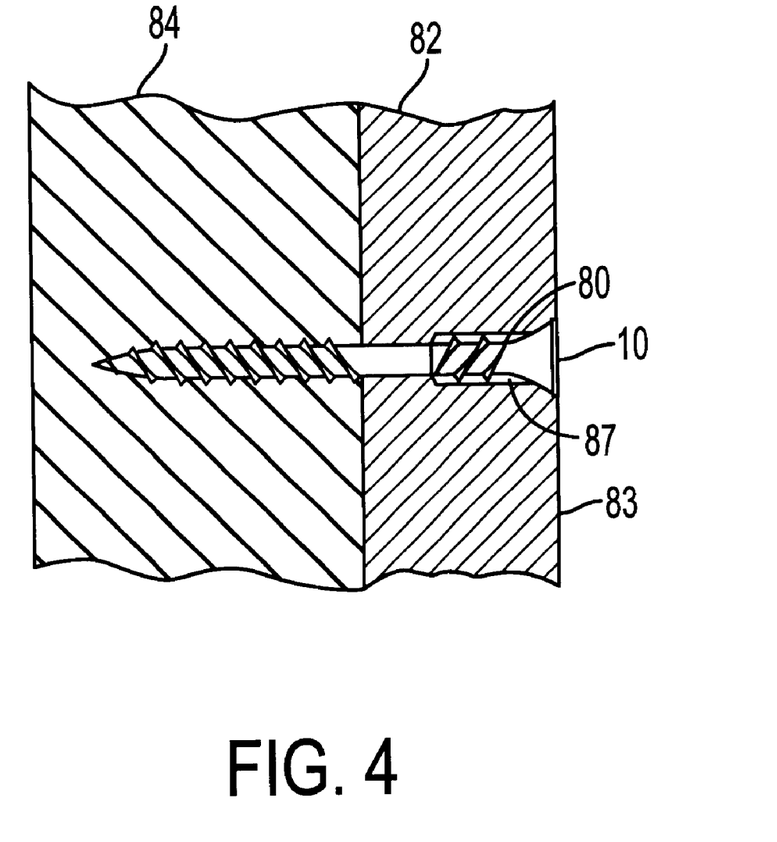
FIG. 4 is a view similar to FIG. 2.

Refer now to FIG. 4 that illustrates the screw 10, the remnant-producing material 82, the base material 84, and the remnants 80. In use, at this stage of the method of the present invention the fastener 10 is completely inserted into the remnant-producing material 82. Remnants 80 that have been cut, extruded, or otherwise removed from the remnant-producing material 82, as illustrated in FIGS. 1 and 2, have been forcibly driven into the remnant-producing material 82 by the upper threaded portion 60, neck 70, and head 30. Remnants 80 are below head 30, thus leaving a smooth surface 83 on the remnant-producing material 82.

As is shown in FIG. 4, the screw 10 is utilized to clamp the remnant-producing material 82 to the base material 84. A common problem experienced when attempting to clamp one structure to another with a screw having threaded sections with a constant thread pitch is difficulty in tightly clamping, or seating, the two structures against one another. This is in part a result of a broaching effect stemming from the threaded section closest to the screw head, which leads to jacking, or the tendency for structures to remain separated. To ensure tighter seating of the two structures, a differential should be present between the threaded sections. Conventionally, a differential is approximated by pre-drilling the upper structure.

As shown in FIG. 4, the lower threaded portion 50 has a thread pitch which differs from the thread pitch of the upper threaded portion 60. This differential, coupled with the ability of the upper threaded portion 60 to pull the remnants 80 into, and thereby clean, the bore 87, suppresses jacking and allows a tight clamp between the remnant-producing material 82 and the base material 84. Consequently, an additional step of pre-drilling the remnant-producing material 82 is obviated.

To ensure proper clamping between the remnant-producing material 82 and the base material 84, preferably the uppermost extent of the lower threaded portion 50 should be fully within the base material 84 and close to the mating surfaces of the materials 82, 84 when the head 30 of the screw 10 is seated within the remnant-producing material 82. Since the uppermost extent of the lower threaded portion 50 should be near to the mating surfaces of the materials 82, 84, properly sized and configured screws 10 should be chosen based upon the relative thicknesses of the materials 82, 84.

Figure 5:
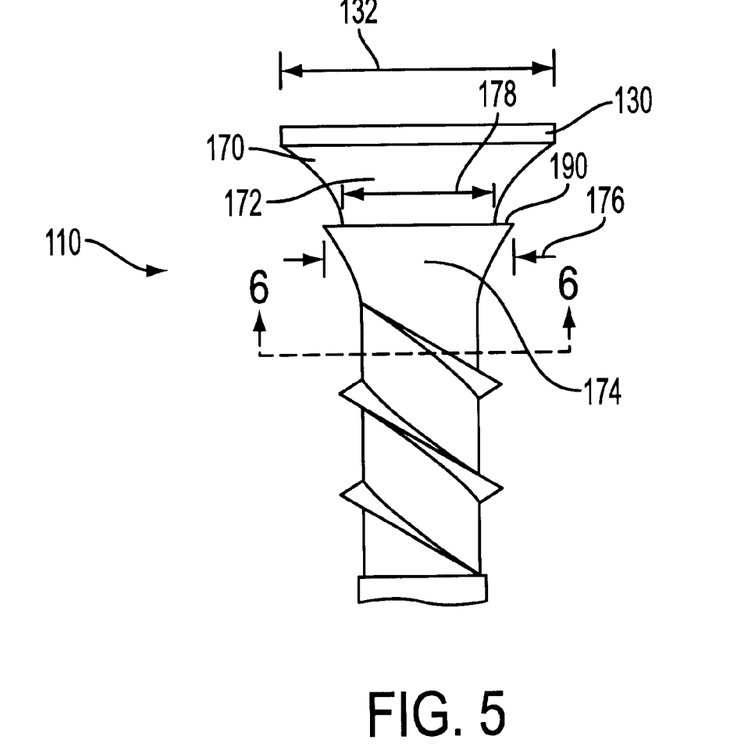
FIG. 5 is a side view of a screw according to another preferred embodiment of the present invention.
Figure 6:
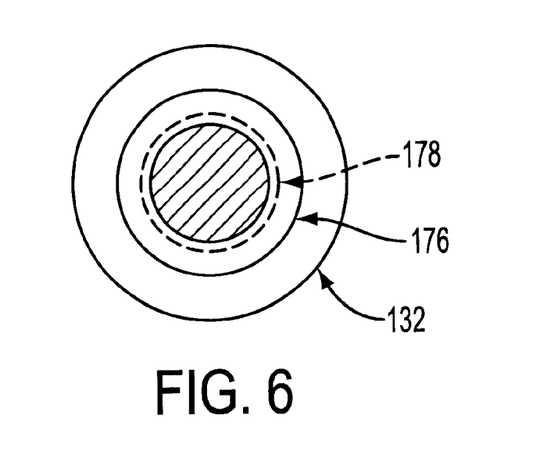
FIG. 6 is a view taken along section line VI—VI of FIG. 5.

Refer now to FIGS. 5 and 6 that show a screw, generally designated by reference numeral 110, according to another embodiment of the present invention. The fastener 110 has a head 130 that has a diameter 132. The fastener 110 has a neck 170 that has a lower neck portion 174 and an upper neck portion 172. The upper neck portion 172 and the lower neck portion 174 are separated by a land surface 190. The land surface 190 has an inside diameter 178 and an outside diameter 176.

As shown in FIG. 6, the lower neck portion 174 and the upper neck portion 172, as well as the neck 170 overall, have substantially tapered leading surfaces. Although the neck 170 has the land surface 190, no substantial abrupt leading surfaces or protrusions exist from the lower neck portion 174 to the head 130 as the neck 170 diameter increases, ultimately becoming the same in diameter as head diameter 132. In use, the substantially tapered leading surface of the lower neck portion 174 and an upper neck portion 172 can be inserted into a workpiece so that no substantial abrupt surface or protrusion enters the workpiece in a leading fashion, i.e. faces the workpiece in the direction of entry. Because the land surface 190 is not a leading surface, its abrupt nature should not substantially inhibit insertion of the screw into the workpiece. In the preferred embodiment of the neck illustrated in FIGS. 5 and 6, the remnants 80 that are cut or extruded from the remnant-producing material 82 may also be captured by the lower neck portion 174, the upper neck portion 172, and the land area 190.

Figure 7:
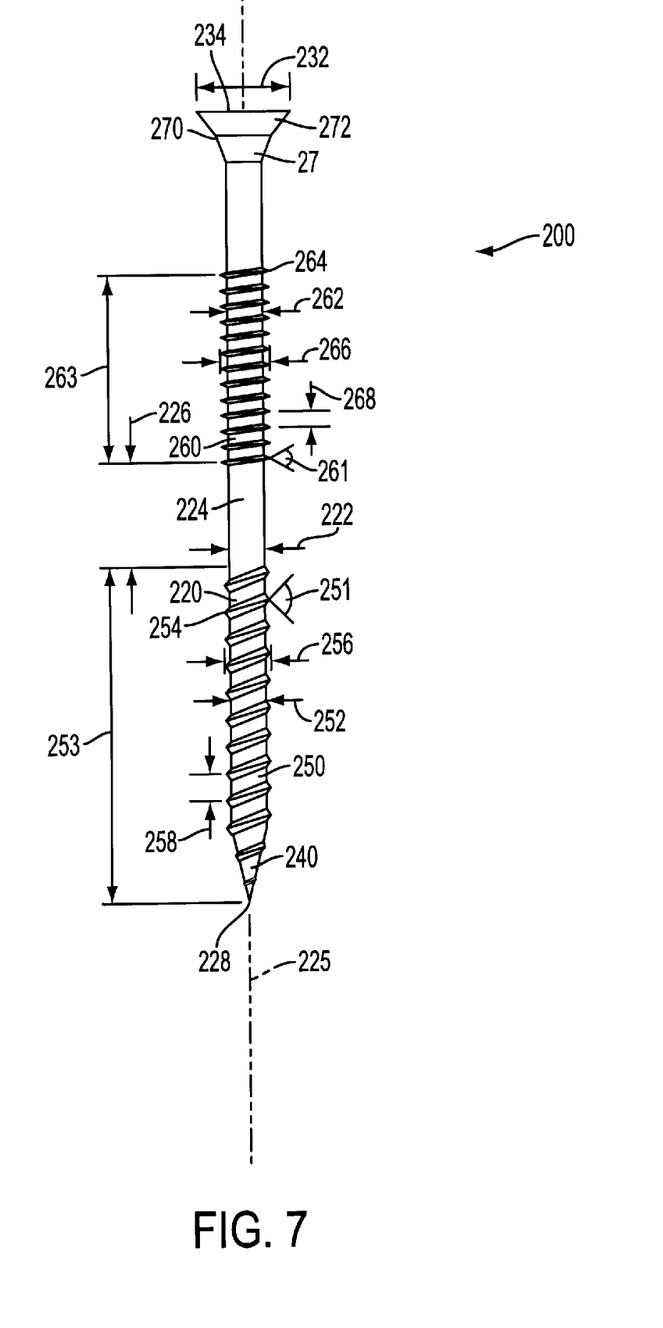
FIG. 7 is a side view of a screw according to another preferred embodiment of the present invention.

Refer now to FIG. 7 there being shown a screw, generally designated by reference numeral 200, according to another embodiment of the present invention. The screw 200 has a first or lower threaded portion 250 that has threads 254. The threads 254 have a thread pitch 258 and a thread diameter 256. The screw 200 has a second or upper threaded portion 260 that has threads 264. The threads 264 have a thread pitch 268 and a thread diameter 266.

In this embodiment of the present invention, the lower threaded portion threads 254 and the upper threaded portion threads 264 spiral the same direction. Preferably, the threads 254 and 264 are right-hand threads, however, the threads 254 and 264 may be left-hand threads. In the illustrated embodiment, the lower threaded portion thread pitch 258 is greater than the upper threaded portion thread pitch 268. Preferably, the lower threaded portion thread diameter 256 is smaller than the upper portion thread diameter 266. Also preferably the lower threaded portion thread angle 251 is greater than the upper portion thread angle 261, because it is desired that the upper threads will grasp and pull material down the bore rather than extrude a new thread pattern in the bore.

The screw 200 has a transition section 224 that has no threads. The transition section provides an annulus between it and the inside surface of the bore for accepting remnant and bore material being drawn through the bore and may be selected to reside proximate the intersection of the two pieces being fastened together to thus aid in drawing those pieces together. Alternatively, no transition zone may be used. As is noted with reference to the threaded portions 50, 60 shown in FIG. 4, the thread pitch of the lower and upper threaded portions 250, 260 are different, and that difference suppresses jacking and enhances tight clamping between the remnant-producing material 82 and the base material 84.

Figure 8:
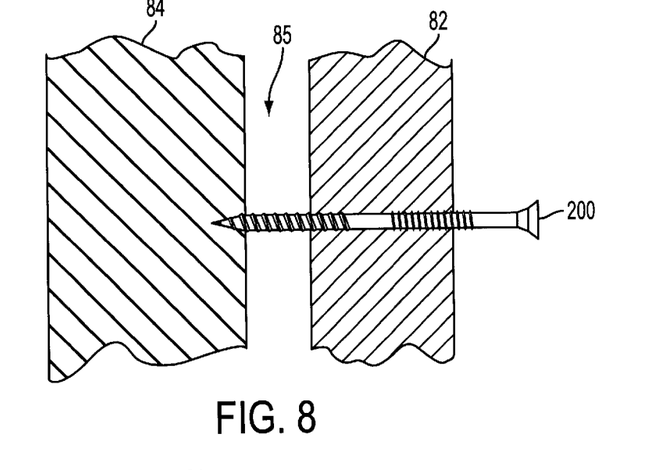
FIG. 8 is a cross-sectional view showing the screw of FIG. 7 engaged in a remnant producing material.
Figure 9:
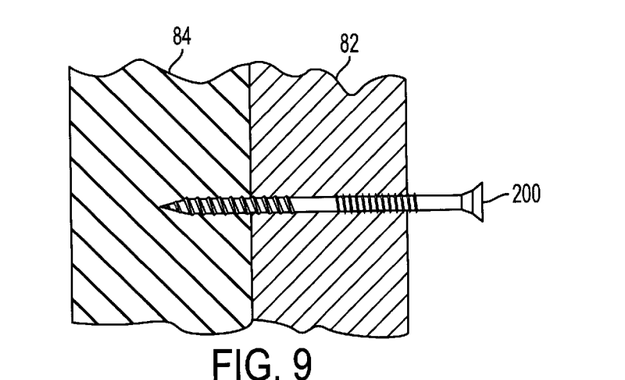
FIG. 9 is a view like FIG. 8.
Figure 10:
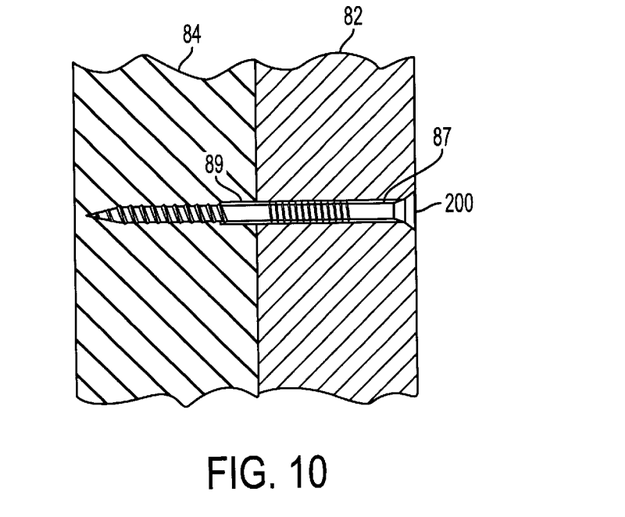
FIG. 10 is a view like FIG. 8.

A benefit of this embodiment is that the remnant-producing material 82 is urged toward the base material 84 if there is a gap between the two materials 82 and 84 at the time the screw 200 is inserted. Because the lower threaded portion thread pitch 258 is greater than the upper threaded portion thread pitch 268, the lower threaded portion 250 will travel at a quicker axial rate through a material than will the upper threaded portion 260. In use, with reference to FIG. 8, there may be a gap 85 between the remnant-producing material 82 and the base material 84 when the screw 200 engages the base material 84. With reference to FIGS. 9 and 10, the lower threaded portion 250 will travel at a quicker axial rate through the base material 84 relative to the axial travel rate of the upper threaded portion 260 through the remnant-producing material 82. Therefore, the remnant-producing material 82 will be urged toward the base material 84. Also shown in FIG. 10 are the annulus 89 which provides space for accepting bore material and remnants, and the bore 87 made by the threads 264. Finally, it should be noted that the uppermost extent of the lower threaded portion 250 is fully within the base material 84 and near to the mating surfaces of the materials 82, 84 when the head of the screw 200 is seated within the remnant-producing material 82. While it is possible for a portion of the upper threaded portion 260 to extend into the base material 84, as shown in FIG. 10 all of the upper threaded portion 260 is resident within the remnant-producing material 82. Preferably, since the uppermost extent of the lower threaded portion 250 should be near to the mating surfaces of the materials 82, 84, properly sized and configured screws 200 should be chosen based upon the relative thicknesses of the materials 82, 84.

Figure 11:
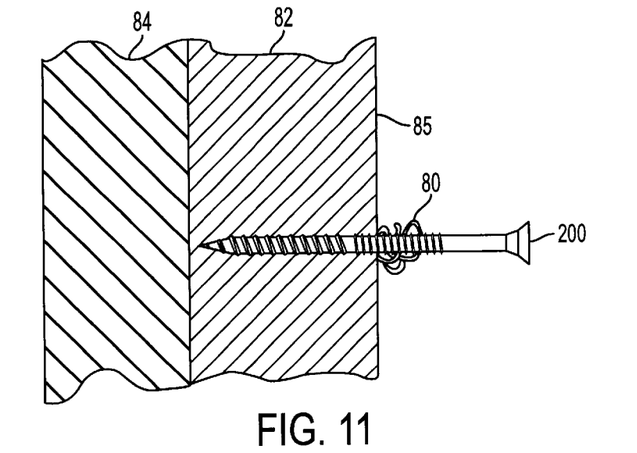
FIG. 11 is a view like FIG. 8.
Figure 12:
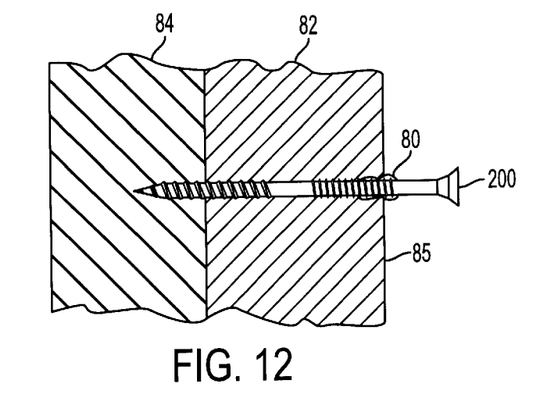
FIG. 12 is a view like FIG. 8.
Figure 13:
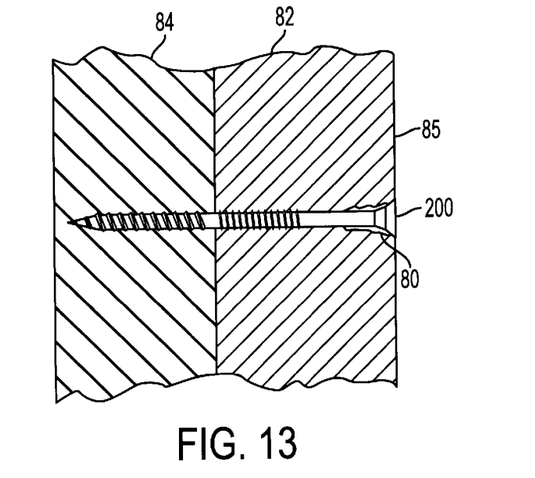
FIG. 13 is a view like FIG. 8.
Figure 14:
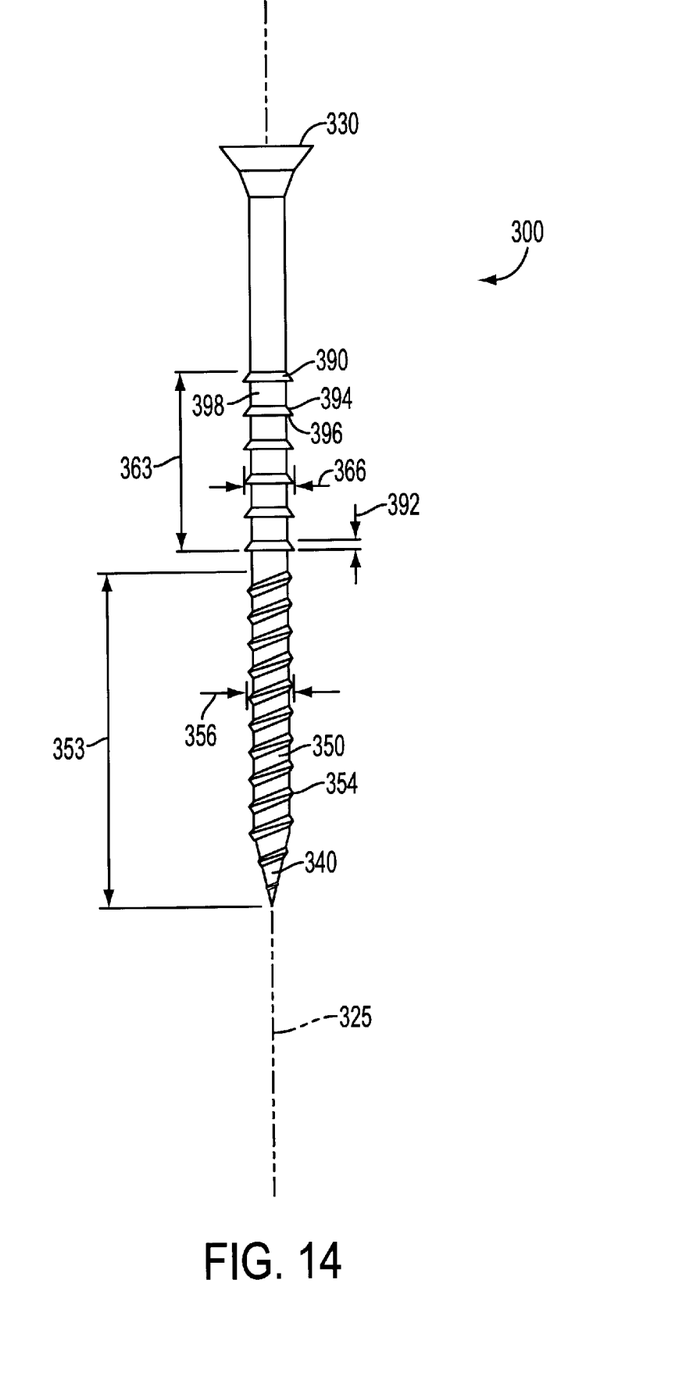
FIG. 14 is a side view of a screw according to another preferred embodiment of the present invention.

Refer now to FIGS. 11, 12, and 13, that illustrate how the screw 200 captures the remnants that have been extruded onto the surface of the remnant-producing material. In use, remnants 80 that are shaved, cut, or otherwise pushed to the surface 83 of the remnant-producing material 82 are captured by the threads 264 of the upper threaded portion 260. Because the upper threaded portion thread pitch 268 is smaller than the lower thread pitch 258, the upper threads 264 are able to capture the remnants 80. Additionally, because the upper thread pitch 268 is smaller than the lower thread pitch 258, the upper threads 264 deform the path cut in the remnant producing material 82 by the lower threads 254. Alternatively, the above mentioned useful task can be accomplished if the upper portion thread diameter 266 is greater than the lower portion thread diameter 256. When the screw 200 is fully inserted, the remnants 82 are forcibly driven into the remnant-producing material 82. Refer now to FIG. 14 that shows a screw, generally designated by reference numeral 300, according to another embodiment of the present invention. The screw 300 has a lower threaded portion 350 having threads 354 that a thread diameter 356. Instead of an upper threaded portion, the screw 300 has an upper annular ridge section 398 (spaced threads with zero pitch) that has annular ridges 390. The annular ridges have a ridge diameter 366 and a ridge height 392. Preferably, the ridge diameter 366 is greater than the lower thread diameter 356. The ridge diameter 366 may be equal to or smaller than the lower thread diameter 356. The annular ridge section 398 has a length 363 that may be smaller, equal to, or greater than the lower portion thread length 353. The annular ridges 390 have horizontally flat surface 396 and an angled surface 394. On the screw 300, the annular ridge flat surface is facing the tapered tip 340, and the annular ridge angled surface 394 faces the head 330.

The above description and drawings are only illustrative of preferred embodiments of the present inventions, and are not intended to limit the present inventions thereto. Any subject matter or modification thereof which comes within the spirit and scope of the following claims is to be considered part of the present inventions.

What is claimed as new and desired to be protected by Letters Patent of the United States is:

1. A screw comprising:
   a shank having a head end and a point end;
   said shank having a first threaded section and a second threaded section, said first threaded section being closer to said point end than said second threaded section;
   said first threaded section having threads that have a first pitch, said second threaded section having threads that have a second pitch, wherein said first pitch is greater than said second pitch;
   said first threaded section having a first thread diameter, said second threaded section having a second thread diameter larger than said first thread diameter, and said head having a third diameter, said third diameter being greater than said first and second diameters; and
   said first threaded section having a first thread angle, said second threaded section having a second thread angle smaller than said first thread angle.

2. The screw as in claim 1 further comprising a neck section extending between said head and said threaded sections.

3. The screw as in claim 2, wherein said neck has leading surfaces, said leading surfaces being substantially tapered to increase in diameter in a direction from said threaded sections towards said head.

4. The screw as in claim 3 wherein said neck further contains a land surface.

5. The screw as in claim 1 wherein said first threaded section and said second threaded section are separated by a transition section having no threads.

6. The screw as in claim 1 wherein said first threaded section and said second threaded section have right hand threads.

7. The screw as in claim 1 wherein said point end includes a tapered segment.

8. The screw as in claim 1 wherein said first threaded section has right hand threads and said second threaded section has left hand threads.

9. The screw as in claim 1 wherein said second threaded section comprises annular ridges.

10. A screw comprising:
    a shank having a head end and a point end on a tapered section, said head end having a recess to accommodate a driving tool;
    said shank having a first threaded section and a second threaded section, said first threaded section being closer to said point end than said second threaded section;
    said first threaded section having right-hand threads that have a first pitch, said second threaded section having right-hand threads that have a second pitch smaller than said first pitch;
    said first threaded section having a first thread diameter, said second threaded section having a second thread diameter larger than said first thread diameter, and said head having a third diameter larger than said first and second diameters;
    said first threaded section having a first thread angle, said second threaded section having a second thread angle smaller than said first thread angle; and
    said shank having a transition section with no threads between said first and second threaded sections, and a neck section extending between said head and said second threaded section, said neck having a leading surface, said leading surface being substantially tapered to increase in diameter in a direction from said second threaded section towards said head.

11. A screw for clamping two structures to each other, comprising:
    a shank having a head end, a point end, a first threaded section and a second threaded section, said first threaded section being closer to said point end than said second threaded section;
    a transition section having no threads between said first and second threaded sections, and a neck section extending between said head and said second threaded section, said neck having a leading surface, said leading surface being substantially tapered to increase in diameter in a direction from said second threaded section towards said head;
    wherein said first threaded section has right-hand threads that have a first pitch and said second threaded section has right-hand threads that have a second pitch which is smaller than said first pitch, and wherein said first threaded section has a first thread angle and said second threaded section has a second thread angle smaller than said first thread angle; and wherein said threaded sections each have a length such that when said head is adapted to be seated in one structure, said first threaded section is adapted to be completely within the other structure.

12. A screw comprising:

a shank having a head end and a point end on a tapered section, said head end having a recess to accommodate a driving tool;

said shank having a first threaded section, a second threaded section, and a transition section between said first threaded section and said second threaded section, said first threaded section being closer to said point end than said second threaded section;

said first threaded section having threads with a continuous first pitch, said second threaded section having threads with a continuous second pitch smaller than said first pitch;

said first threaded section having a first thread diameter, said second threaded section having a second thread diameter larger than said first thread diameter, and said head having a third diameter larger than said first and second diameters;

said first threaded section having a first thread angle, said second threaded section having a second thread angle smaller than said first thread angle;

a neck section extending between said head and said second threaded section, said neck being substantially tapered to increase in diameter in a direction from said second threaded section towards said head.

13. A screw comprising:

a shank having a head end and a point end on a tapered section, said head end having a recess to accommodate a driving tool;

said shank having a first threaded section, a second threaded section, and a transition section between said first threaded section and said second threaded section, said first threaded section being closer to said point end than said second threaded section;

said first threaded section having threads with a substantially continuous first pitch, said second threaded section having threads with a substantially continuous second pitch smaller than said first pitch;

said first threaded section having a first thread diameter, said second threaded section having a second thread diameter larger than said first thread diameter, and said head having a third diameter larger than said first and second diameters;

said first threaded section threads having a substantially similar first thread angle, said second threaded section threads having a substantially similar second thread angle smaller than said first thread angle; and a neck section extending adjacent said second threaded section.

\* \* \* \* \*